(12) United States Patent
Lee et al.

(10) Patent No.: US 10,976,037 B2
(45) Date of Patent: Apr. 13, 2021

(54) JUNCTION STRUCTURE FOR LOWERING LIGHTING USING UNMANNED AERIAL VEHICLE

(71) Applicant: Chun Yee Lee, Hong Kong (HK)

(72) Inventors: Chun Yee Lee, Hong Kong (HK); Ka Lun Lee, Hong Kong (HK); Chui Fong Lau, Hong Kong (HK)

( * ) Notice: Subject to any disclaimer, the term of this patent is extended or adjusted under 35 U.S.C. 154(b) by 117 days.

(21) Appl. No.: 16/440,842

(22) Filed: Jun. 13, 2019

(65) Prior Publication Data

US 2019/0383476 A1     Dec. 19, 2019

(51) Int. Cl.
| | |
|---|---|
| *F21V 21/36* | (2006.01) |
| *B64C 39/02* | (2006.01) |
| *F21S 8/06* | (2006.01) |
| *F21V 21/112* | (2006.01) |
| *F21V 19/04* | (2006.01) |

(52) U.S. Cl.
CPC ............ *F21V 21/36* (2013.01); *F21S 8/061* (2013.01); *F21V 21/112* (2013.01); *B64C 39/024* (2013.01); *B64C 2201/128* (2013.01); *F21V 19/04* (2013.01)

(58) Field of Classification Search
CPC ........ F21V 21/36; F21V 21/112; F21V 19/04; F21S 8/061; B64C 39/024; B64C 2201/128

USPC ..................................................... 362/147
See application file for complete search history.

(56) References Cited

U.S. PATENT DOCUMENTS

| | | | | |
|---|---|---|---|---|
| 9,815,197 | B1 * | 11/2017 | Pickover | B25J 5/00 |
| 10,498,081 | B1 * | 12/2019 | Benner | H01R 13/631 |
| 10,545,501 | B1 * | 1/2020 | Lipton | H01J 9/003 |
| 2015/0049462 | A1 * | 2/2015 | Carlen | F21V 21/30 362/95 |
| 2016/0309346 | A1 * | 10/2016 | Priest | B64C 39/024 |
| 2018/0257774 | A1 * | 9/2018 | Volpi | B25J 15/00 |
| 2019/0003687 | A1 * | 1/2019 | Chiu | B64D 1/22 |
| 2019/0078766 | A1 * | 3/2019 | Lippert | B64D 1/22 |
| 2020/0011487 | A1 * | 1/2020 | Creusen | F21S 8/08 |
| 2020/0132286 | A1 * | 4/2020 | Carlen | F21S 8/086 |

FOREIGN PATENT DOCUMENTS

| | | | | |
|---|---|---|---|---|
| WO | WO-2019009797 A1 * | 1/2019 | | F21V 17/002 |
| WO | WO-2019177528 A1 * | 9/2019 | | B25J 15/00 |

\* cited by examiner

*Primary Examiner* — Christopher M Raabe
(74) *Attorney, Agent, or Firm* — W&K IP

(57) ABSTRACT

An electrical and mechanical junction structure for lighting or signage hanging high above the ground is provided. This junction structure is separable into two components by an actuation connector to facilitate the lowering and raising of the lighting or signage for maintenance. The actuation connector is raised and inserted into the junction structure by an unmanned aerial vehicle.

9 Claims, 10 Drawing Sheets

JUNCTION STRUCTURE FOR LOWERING LIGHTING USING UNMANNED AERIAL VEHICLE

CROSS-REFERENCE TO RELATED APPLICATIONS

This application claims priority to HONG KONG Patent Application No. 18107783.6 with a filing date of Jun. 15, 2018. The content of the aforementioned application, including any intervening amendments thereto, are incorporated herein by reference.

FIELD OF THE INVENTION

The present invention relates to the field of automatic mechanisms, and more particularly to a junction structure and system for lowering and raising the lightings or signage for maintenance, and the operation of the junction structure is assisted by an unmanned aerial vehicle.

BACKGROUND OF THE INVENTION

For lighting or signage hanging down from a high ceiling, maintenance or replacement work is performed manually. Workers working at height are costly and not efficient. The only present solution in the market is some electrical devices installed on top of a lighting device to lower or raise it. However, this kind of electrical device requires a strong electric motor and long steel wire to do the job. And they are costly and bulky. It is not cost-effective to install such device for each lighting. Our invention is a simple junction structure installed onto a lighting device or signage. Assisted with an unmanned aerial vehicle, they can perform the duties of lowering and raising the lighting device or signage hanging high above the ground. This junction structure does not have any electric motor or long steel wire. Therefore, it is a simple, cost-effective and reliable solution to perform maintenance or replacement work for lightings or signage without manual working at height.

SUMMARY OF THE INVENTION

For the defects in the prior art, an object of the present invention is to provide a system for raising and lowering lighting or signage using an unmanned aerial vehicle which is simple, cost-effective and reliable.

The technical solutions of the present invention are as follows:

In one aspect, a junction structure for lowering and raising lighting or signage is provided. The junction structure is installed onto the lighting or signage hanging high above the ground and configured to provide main mechanical and electrical connection for the lighting or signage; the junction structure is separable into at least a first junction part and a second junction part; the first junction part is bonded to the lighting or signage and the second junction part is permanently suspending and staying above the ground; during normal service life of the lighting or signage, the two junction parts are latched together by a mechanical latch; and when lighting or signage maintenance is needed, the two junction parts are capable of being unlatched and separated by an actuation connector.

Advantageously, the junction structure comprises: the first junction part which is a lower part of the junction structure bonded to the lighting or signage; the second junction part which is an upper part of the junction structure permanently suspending from the ceiling or supporting structure and staying high above the ground; a latch located in-between the first and second junction parts so as to latch them together; an electric plug located at an interface between the first and second junction parts and composed of a male and a female connectors positioned separately on the interface between the first and second junction parts; and a cavity configured to accommodate the actuation connector and enable the actuation connector to engage with the junction structure so as to actuate the latch, wherein the cavity is a through-hole along a central vertical axis of the junction structure and the cavity surface is of conical shape.

Advantageously, the latch comprises a circular latch shaft, a latch ring and a rotary ring; the circular latch shaft is rotatable as so to insert into the latch ring; the latch shaft and the latch ring are installed separately onto matching surfaces of the first and second junction parts; the latch shaft is fixed onto the rotary ring installed in a plane of the first junction part; the rotary ring has a spline or gear structure to match with another spline or gear in the actuation connector so that rotational actuation from the actuation connector can be transmitted to the rotary ring after the actuation connector engages with and locks to the junction structure; and the latch ring installed in the second junction part is capable of stemming out for reach and match of the insertion of the latch shaft.

In another aspect, a system for lowering and raising a lighting device or signage is provided. The system comprises: all of the above mentioned components of the junction structure; an actuation connector bonded with a long wire and capable of being raised to and engaged with the junction structure to lower the lighting or signage; wherein after engagement, the junction structure is separated into the two junction parts by an actuation of the actuation connector, subsequently the lighting or signage can be lowered to ground using the long wire; and after maintenance, using the long wire, the lighting or signage can be raised back to original height and resuming normal service; and an unmanned aerial vehicle used to raise the actuation connector to the junction structure and ensure the actuation connector engaged with the junction structure.

Advantageously, the unmanned aerial vehicle is capable of raising the actuation connector towards a hole in the junction structure and then inserting the actuation connector into the hole; at the same time the long wire in the actuation connector is also raised to the junction structure; and then the other end of the long wire hangs down to the ground after the actuation connector engaged with the junction structure, or it just stays on the ground during the operation.

Advantageously, the actuation connector is configured to latch and unlatch the latch in the junction structure and to raise the long wire to the junction structure for lowering the lighting or signage; the actuation connector has a rod-like shape with an approximately conical surface which is matching with the shape of an inner surface of the through-hole in the junction structure so that the engagement of the actuation connector with the junction structure is therefore simply an insertion action of the conical actuation connector into the conical through-hole in the junction structure; cross-sections of the actuation connector and the through-hole are deviated from circular shape so that when the actuation connector is inserted into the through-hole, angular relation between the first and second junction parts is fixed during recombination; and the actuation connector comprises: a separable body structure which is separable into an upper and a lower connector section during the lowering of the lighting or signage; wherein the two sections are bound by adhesive before the separation; and the adhesive bond can be broken during separation; a locking actuator used to lock the actuation connector to the junction structure by an actuation of the locking actuator after the engagement of the actuation connector with the junction structure; a latching actuator used to operate the latch in the junction structure; wherein actuation of the latching actuator is capable of latching and unlatching the latch in the junction structure through a spline or gear structure after engagement of the actuation connector with the junction structure; and a wire connection mechanism used to raise the long wire to engage with the junction structure; wherein one end of the long wire is fixed and wired inside the actuation connector; after engagement of the actuation connector with the junction structure, the junction structure is unlatched; after unlatched, the first junction part is separated and lowered by holding and releasing the long wire held by an operator or a machine on the ground; and the lighting or signage is lowered to ground together with the first junction part.

Advantageously, the locking actuator has a locking component; movement of the locking component is capable of locking the actuation connector to the junction structure during the engagement of the actuation connector with the junction structure; the locking component is a small rotor located at the tip of the upper connector section; movement of the rotor is capable of locking the actuation connector to the second junction part due to geometric constraint; the rotor is an ellipsoid or cuboid with its cross-section having a certain aspect ratio other than one; the ellipsoidal or cuboidal rotor is stemming out of a top surface of the second junction part after the engagement of the actuation connector with the junction structure; the rotor is capable of rotating about an axis of the actuation connector; with such elliptic cross-sectional geometry, after a ninety degrees rotation, the rotor cannot recess backward; therefore the actuation connector is locked to the second junction part.

Advantageously, the latching actuator is configured to actuate the latch in the junction structure after the actuation connector locked to the junction structure; the actuation is transmitted through a spline or gear structure to latch and unlatch the latch; the latching actuator is a rotary latching actuator structured as part of the body structure of the actuation connector and has spline on its rotary circumferential surface; when the actuation connector is locked to the junction structure, a rotor of the latching actuator contacts with the rotary ring in the junction structure by matching the spline structures on both sides; then the rotation of the latching actuator can be transmitted to the rotary ring and the latch shaft.

Advantageously, the wire connection mechanism comprises: a fixation point in the lower connector section for fixing one end of the long wire; a pulley in the upper connector section; a channel for the long wire in the lower and upper connector sections, which runs along a central axis; and the long wire wired from the fixation point in the lower connector section through the channel to the pulley in the upper connector section, then turned around the pulley and then gone back through the channel to exit the lower connector section, and finally hung down to ground; wherein the wire connection mechanism is embedded in the body structure of the actuation connector.

Advantageously, ultrasonic motors are used as the locking and latching actuators.

The operation process of lowering the lighting or signage is introduced as follow. Firstly, the actuation connector is raised to the lighting or signage by the unmanned aerial vehicle or an equivalent device. It is inserted into the through-hole in the junction structure. The long wire bonded to the actuation connector is hanging down to the ground and is held by an operator or a machine on the ground. By remote control, the upper connector section is then locked to the junction structure. Then also by remote control, the actuation connector unlatches the junction structure to release the first junction part. By holding the long wire on the ground, the first junction part and the lighting are slowly lowered to the ground for maintenance.

The process of raising the lighting or signage after maintenance is the reverse of lowering. The lighting or signage and the first junction part hooked by the lower connector section is connected to the upper connector section and the second junction part by the wire connection mechanism. The operator or the machine on the ground pulls the long wire to raise the lighting. When the second junction part and the first junction part recombine, they are latched together again by the actuation connector using remote control. Finally, the locking actuator of the actuation connector is released by remote control so that the actuation connector and the long wire drop down to ground.

BRIEF DESCRIPTION OF THE DRAWINGS

FIG. 1a shows a perspective view of a junction structure, FIG. 1b shows a cross-sectional view of the junction structure and an actuation connector, and FIG. 1C shows another cross-sectional view of the junction structure and the actuation connector turned ninety degrees;

FIG. 4a is a top view and FIG. 4b is a perspective view;

DETAILED DESCRIPTION OF THE EMBODIMENTS

Figure 1A:
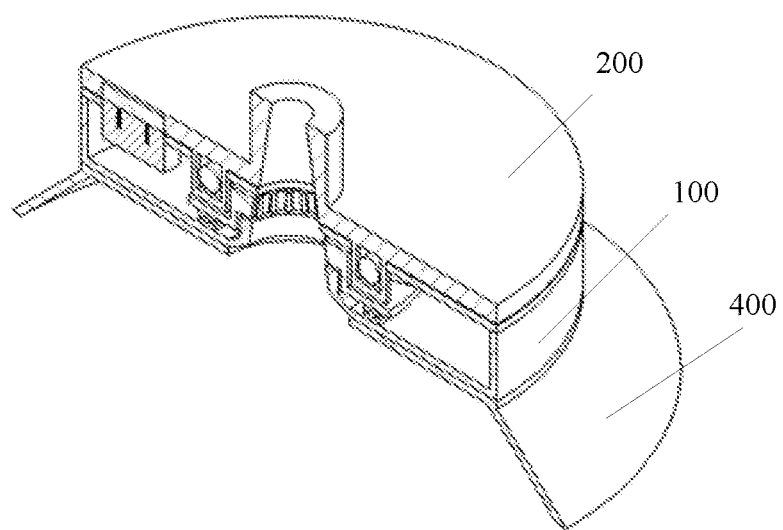
FIGS. 1a-1c are schematic views of a system for raising and lowering lighting or signage according to the present invention.

The present invention will now be more particularly described, by way of example only, with reference to the accompanying drawings. It should be understood that the drawings are for better understanding and should not limit the present invention. Dimensions of components and features shown in the drawings are generally chosen for convenience and clarity of presentation and are not necessarily shown to scale.

This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the disclosure.

Junction Structure

Figure 1B:
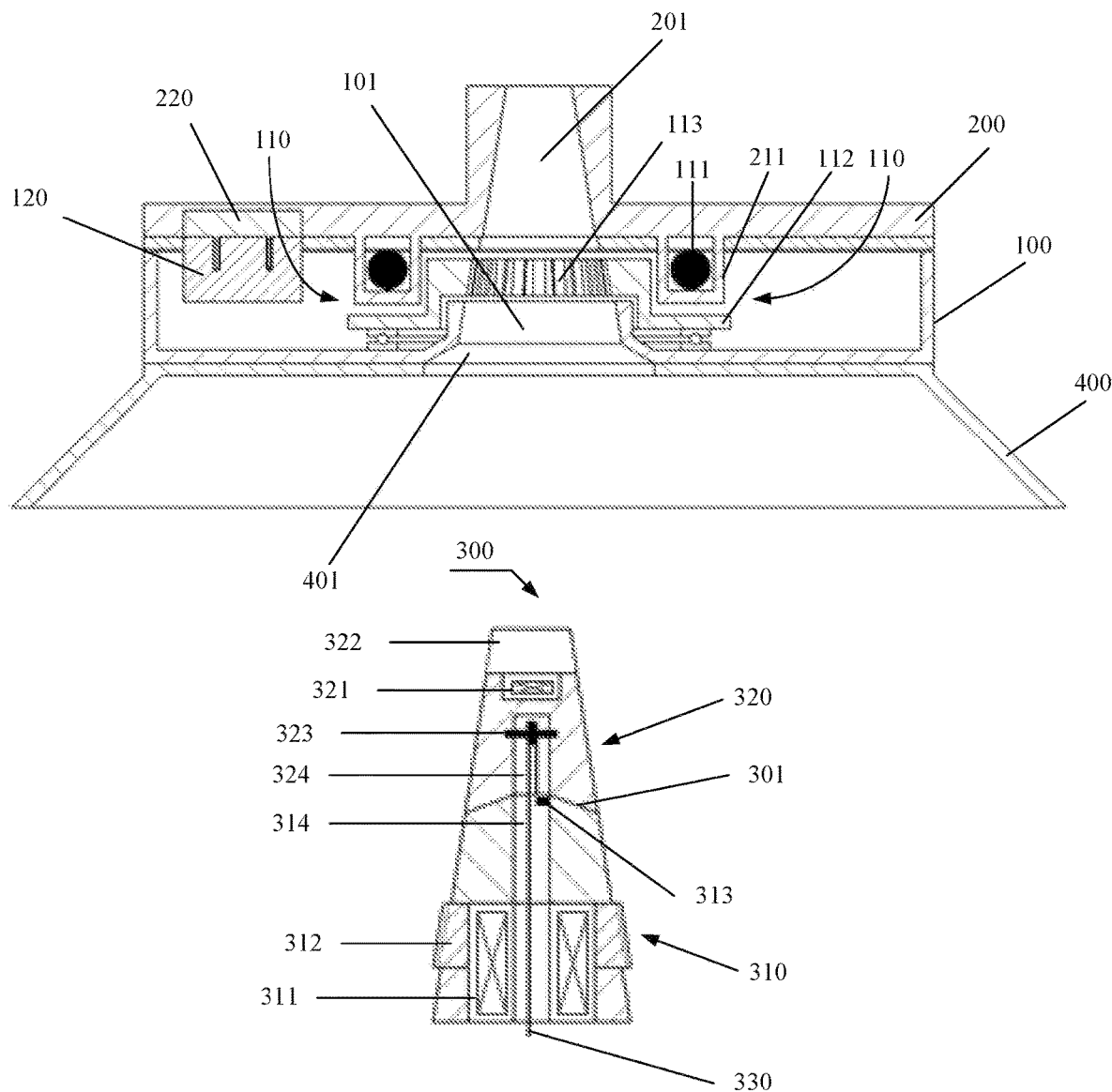
Figure 1C:
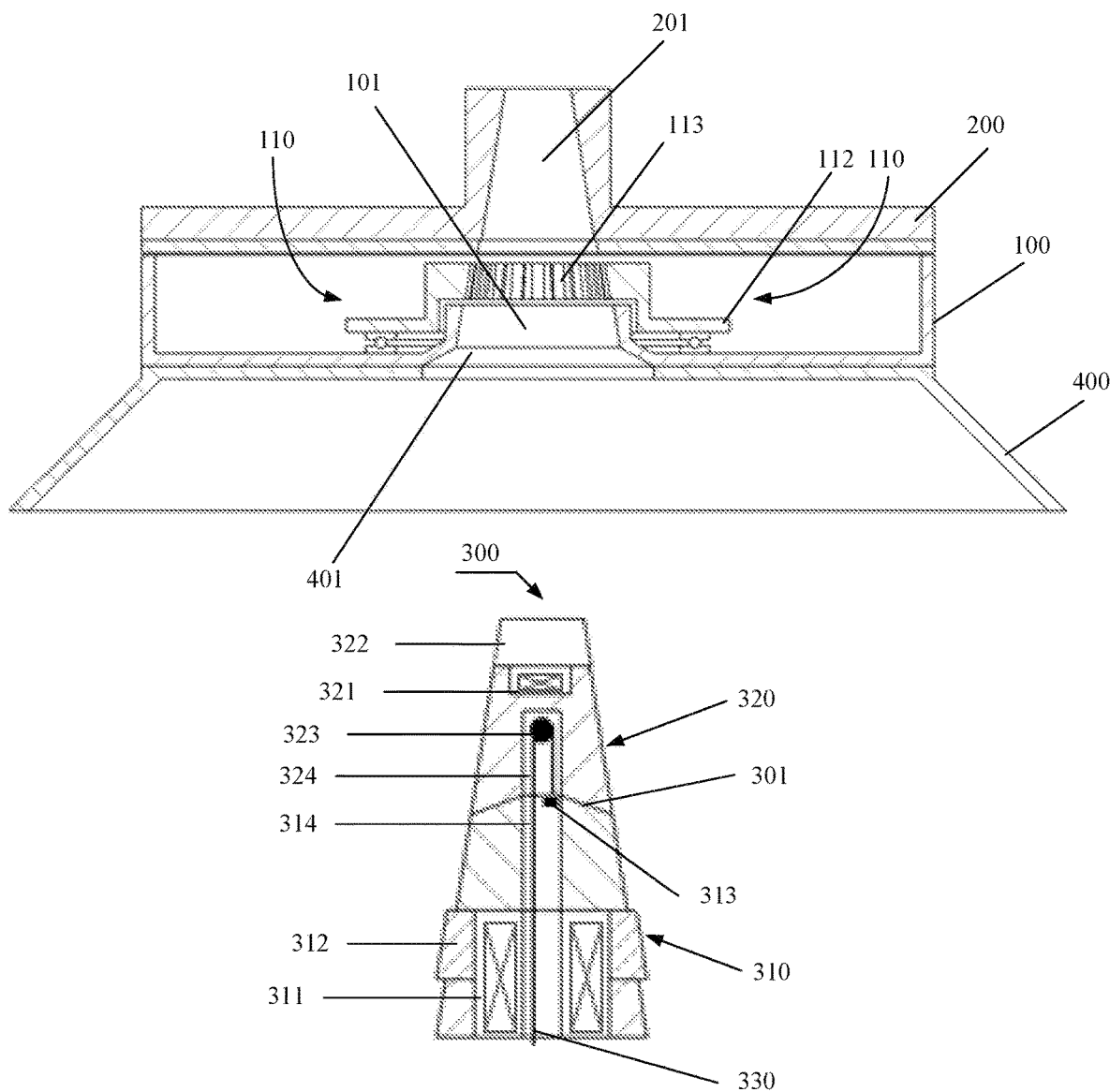

The major structure in this invention is a junction structure and an actuation connector shown in FIGS. 1a-1c. As shown in FIGS. 1a-1c, the junction structure comprises a junction box (a first junction part) 100 and a junction plate (a second junction part) 200 latched together. They can be latched or unlatched by an actuation connector 300.

The junction box 100 is permanently bonded on the top or lateral surface of the lighting housing 400 as shown in FIG. 1b. A major function of the junction box 100 is to provide electricity connection and mechanical support to the lighting. At the same time, the junction box 100 is specially designed for lowering and raising the lighting housing 400 between the ceiling and the ground. The major components of the junction box 100 are the female and male connectors 120 and 220 of an electric plug for conducting electricity and the mechanical latch 110 for latching the junction structure. When unlatched, the junction box 100 can be released and lowered to the ground together with the lighting housing 400. At the central axial position, there is a through-hole 101 passing through.

Figure 3A:
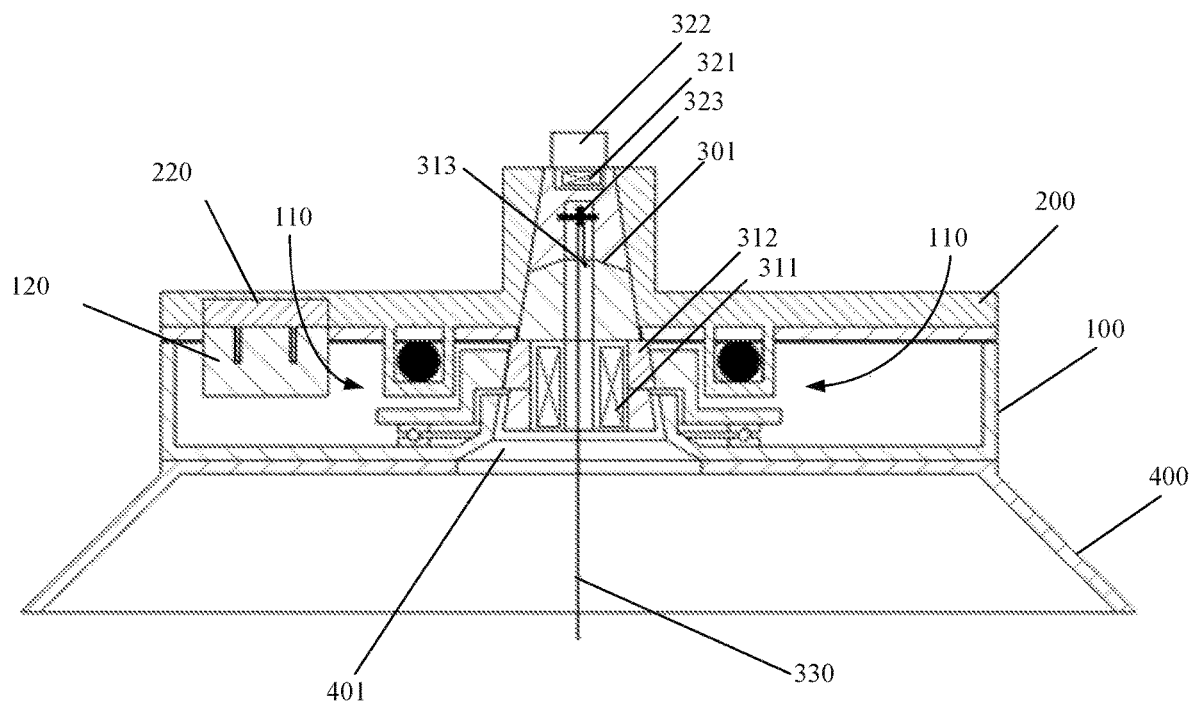
FIGS. 3a and 3b are cross-sectional views showing the actuation connector locked to the junction structure, and the two views are turned ninety degrees to each other.
Figure 3B:
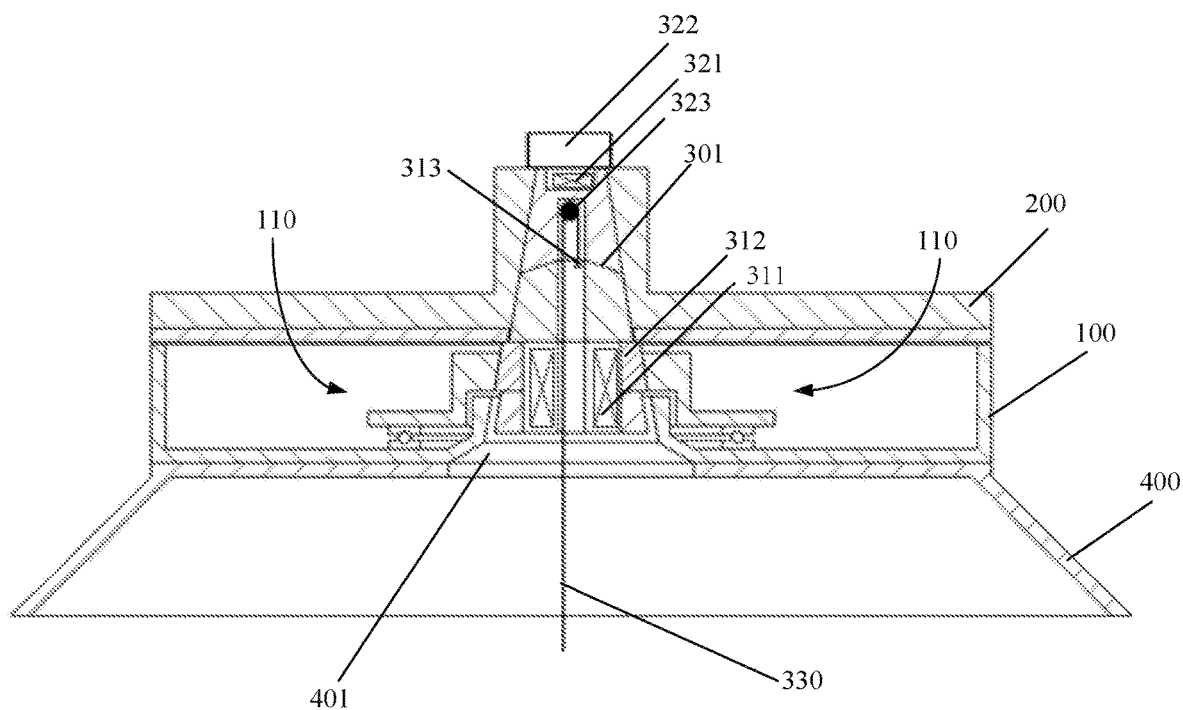
Figure 4A:
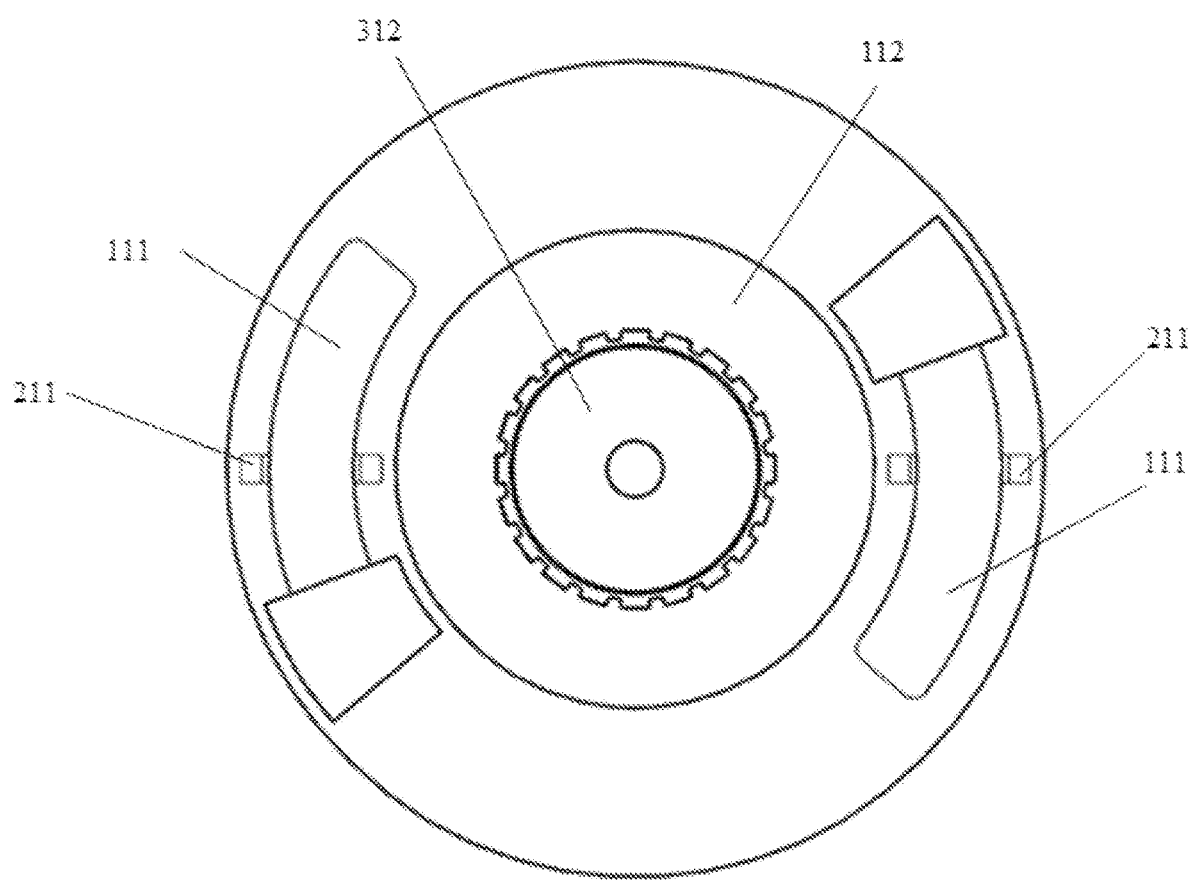
FIGS. 4a and 4b are schematic views showing a latch.
Figure 4B:
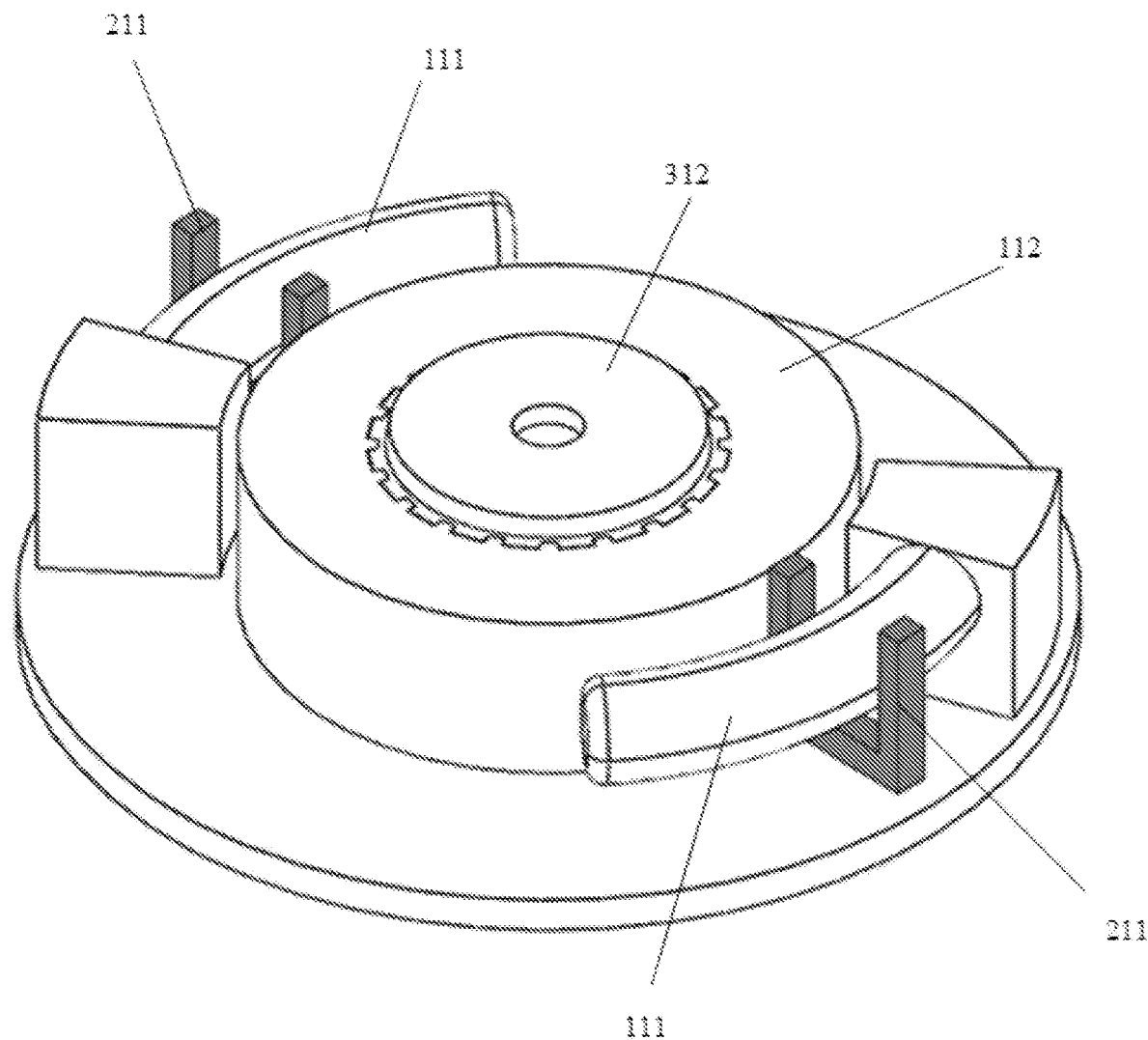

The mechanical latch 110 for latching the junction structure is the major mechanical component in the junction box 100. A planar view of the latch 110 is shown in FIGS. 4a and 4b. Inside the junction box, a rotatable quarter-circular latch shaft 111 can be rotated into a latch ring 211 that is stemmed from the bottom of the junction plate 200. This rotary quarter-circular latch shaft 111 is bonded onto a horizontal flat rotary ring 112. This flat rotary ring 112 is supported with bearings and is freely rotatable. Hence, when the rotary ring 112 and latch shaft 111 is rotated and inserted into the latch ring 211, the junction box 100 and junction plate 200 are latched together. When the latch shaft 111 is removed out of the latch ring 211, the junction box 100 and junction plate 200 are unlatched. To rotate the latch shaft 111 and rotary ring 112, an actuation connector 300 is needed to be inserted into the junction structure. As shown in FIGS. 3a and 3b, for such insertion, there is a through-hole 101 and 201 passing through the centre of the junction structure. The shape of the through-hole is the same as that of the actuation connector 300. Hence, the actuation connector 300 can be inserted and just fitting the through-hole 101 and 201. There is a latching actuator 311 in the actuation connector 300. When this latching actuator 311 is rotated by remote control, its rotation is transmitted to the rotary ring 112 and latch shaft 111 through the rotor 312 with the spline. Hence the latching and unlatching action can be controlled by an operator on the ground using remote control. There are two quarter-circular latches 110 installed oppositely at the same radial distance in the junction box 100 so as to share and balance the weight of the lighting. During latching and unlatching, if the frictional force is too large, it can be reduced by reducing the normal force by pulling the long wire 330.

Electrical connection through an electric plug is the major function of the junction structure. This electric plug is composed of a female connector 120 and a male connector 220. They are positioned oppositely at the interface between the junction box 100 and junction plate 200. Hence when the junction box 100 and junction plate 200 combine together, the electric plug is connected; when they separate, the electric plug is disconnected. The electric plug can be any common standard type suitable for direct insertion.

The junction plate 200 always keeps hanging from the ceiling. Its major functions are to provide electricity connection and suspension support for the lighting. The major functional component is the male connector 220 located opposite to the female connector 120 in the junction box 100. This male connector 220 is wired to the ceiling and supply electricity to the lighting. The other main components in the junction plate 200 are the two latch rings 211 stemmed out of the bottom surface. They are positioned to receive and fit the insertion of the latch shafts 111 in the junction box 100. During normal use of the lighting, the junction box 100 and junction plate 200 are latched together. These two latch rings 211 bears the weight of the lighting. During maintenance and installation, the junction box 100 and junction plate 200 are separated. When the separated junction box 100 is raised and recombined with the junction plate 200, the latch rings 211 are positioned just in front of the latch shafts 111. Then the latch shafts 111 are rotated to pass through the two latch rings 211 and hence the junction structure are latched together. Also, there is a through-hole 201 passing through the centre of the junction plate 200. It is the continuation of the through-hole 101. Its shape is fitting the actuation connector 300. The actuation connector 300 can be inserted and just fitting the through-hole 201 and 101.

Actuation Connector and Lowering and Raising System

Figure 2:
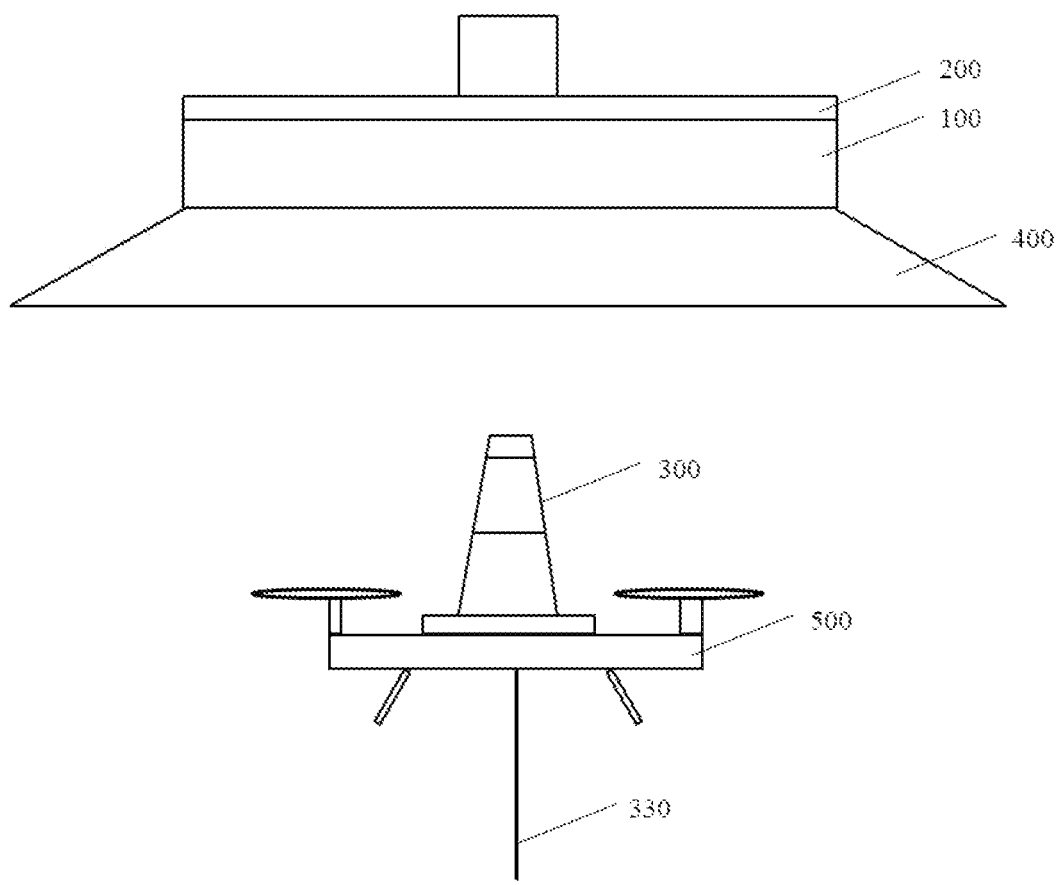
FIG. 2 is a schematic view showing an unmanned aerial vehicle carrying the actuation connector and a long wire to approach the lighting and the junction structure.

For unlatching and lowering the junction structure, an actuation connector 300 is needed to be raised and inserted into the junction structure. An unmanned aerial vehicle 500 or an equivalent device is used to raise the actuation connector 300 to the junction structure for insertion as shown in FIG. 2.

The actuation connector 300 for operating the junction structure is shown in FIGS. 1b and 1c. The actuation connector 300 has three major functions: i) to lock itself to the junction plate 200, ii) to latch and unlatch the junction box 100 and junction plate 200, and iii) to lower and raise the junction box 100 and the lighting housing 400. The shape of the actuation connector 300 is slightly conical for easy insertion. It is to be inserted into the matching through-hole 101 and 201 in the junction structure. Its own body is made up of a lower connector section 310 and an upper connector section 320. They are bound together by adhesive at the interface 301. This adhesive bonding can be easily broken when the upper and lower connector section is needed to be separated. The upper actuation connector section 320 is to be locked to the junction plate 200. After locking, the actuation connector 300 can latch or unlatch the junction structure. The mechanism of its components and operations are introduced as follow.

Firstly, the actuation connector 300 should be able to lock to the junction plate 200. A small rotary locking actuator 321 is designed at the upper end of the actuation connector 300, with a small ellipsoidal rotor 322 at the tip. It can be rotated about the longitudinal axis of the actuation connector 300. The actuation connector 300 can be fully inserted and fitted into the through-hole 101 and 201. After the insertion, the rotor 322 emerges out of the through-hole 201 just above the top surface of junction plate 200. Then it is rotated ninety degrees on the top surface of the junction plate 200 by remote control. Because the cross-section of the rotor 322 is elliptic, this ninety-degree rotation blocks the recession of the upper connector section 320. Hence the upper actuation connector section 320 is locked to the junction plate 200.

Secondly, after locked to the junction plate 200, the actuation connector 300 is to latch or unlatch the junction structure. This action is actuated by a latching actuator 311 in the lower connector section 310. Part of the lower connector section 310 is designed with a latching actuator 311 with a rotor 312 bearing longitudinal spline on its surface. Upon remote control, its rotation is transmitted to the flat rotary ring 112 and the latch shaft 111 in the junction box 100 through the spline 113. This rotation of the latch shafts 111 can go in two directions, performing latching and unlatching through the latch rings 211 stemmed out from the bottom of the junction plate 200.

Figure 5A:
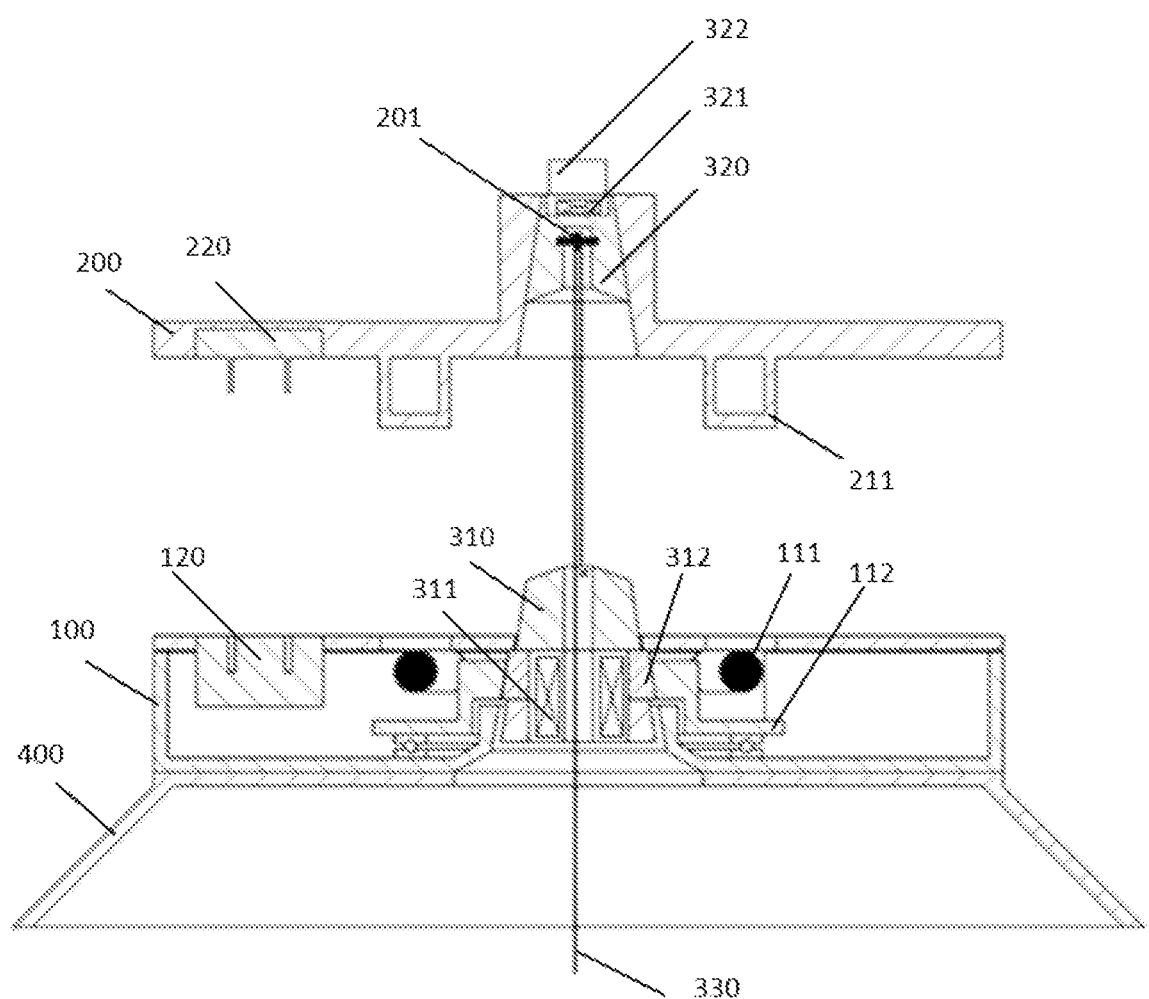
FIGS. 5a and 5b are schematic views showing lowering or raising the junction box and light with the junction plate fixed, and the two views are turned ninety degrees to each other.
Figure 5B:
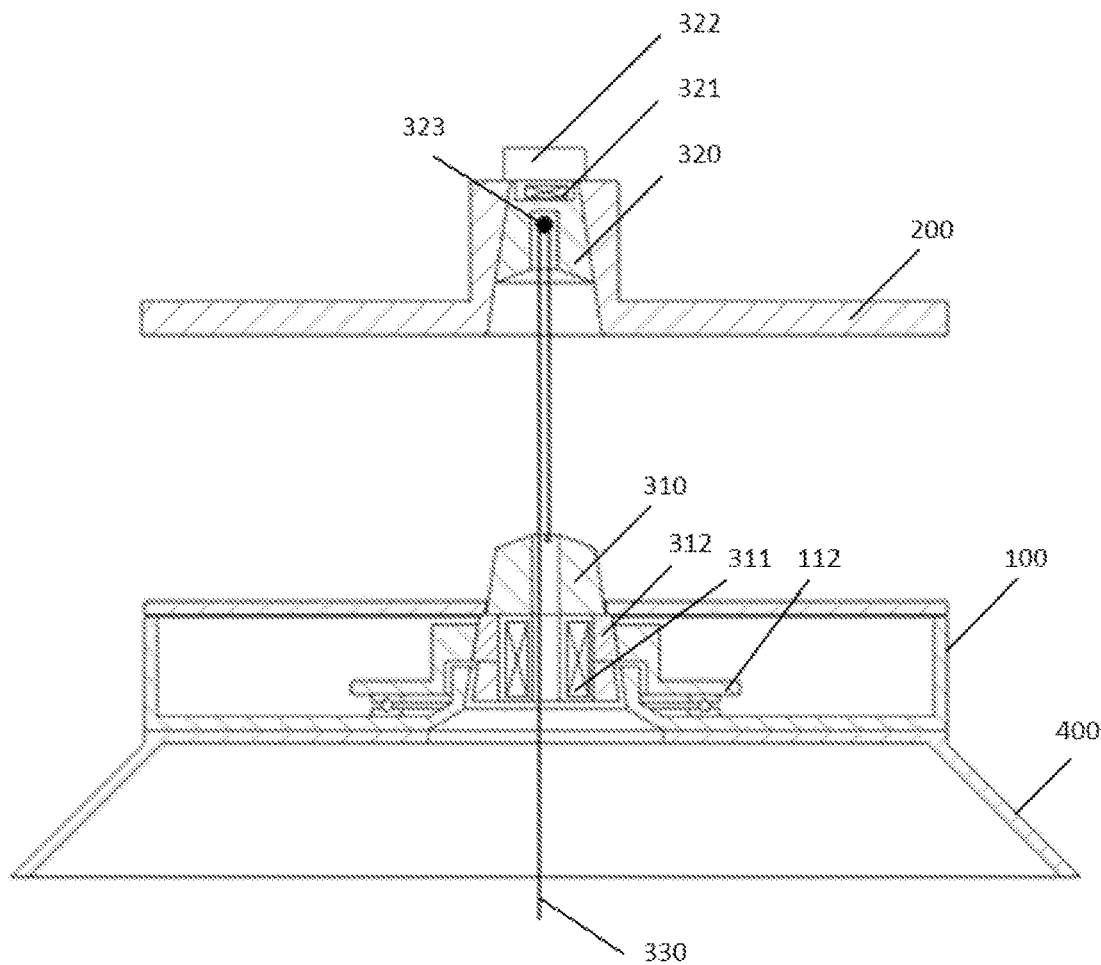

The third duty of the actuation connector 300 is to lower and raise the lighting housing 400 between the ceiling and ground. This work is performed by an embedded wire connection mechanism. The wire connection mechanism comprises the long wire 330, a wire fixation point 313, a pulley 323, and wire channels 314 and 324. Small narrow axial channels 314 and 324 run along the vertical axis of the actuation connector 300. A small pulley 323 is embedded in a cavity inside and near the upper end of the upper connector section 320. It locates at the top end of the axial channel 324. The long wire 330 is fixed to the upper end of the lower connector section 310 at the wire fixation point 313. The long wire 330 runs through the channel 324 towards the pulley 323. The fixation point of the wire 330 can be embedded inside the body of the lower connector section 310. The wire 330 then goes towards and goes around the pulley 323. The wire 330 then runs backward through the channel 324 and 314 and finally hangs down to ground. Therefore, when the actuation connector 300 is locked to the junction plate 200, after unlatching the junction structure, the operator or the machine on the ground can hold the wire 330 and control the lowering and raising of the junction box 100 and the lighting housing 400, just as shown in FIGS. 5*a* and 5*b*.

For the actuation motion of the latching actuator 311 and locking actuator 321 of the actuation connector 300, miniature rotary ultrasonic motors best fit the required characteristics of this application. The actuation mechanism of the ultrasonic motor allows a hollow axial channel passing through it. Ultrasonic motors are also compact enough. The motions need not be very fast. The torque is strong enough. This latching actuator 311 and locking actuator 321 includes the ultrasonic motors, their drivers and batteries as a whole system. The body of the actuation connector 300 can be further extended at its both ends if more space is needed for the latching actuator 311 and locking actuator 321. For the control of all the actuation motions mentioned in this invention, there are remote controls included in the motor drivers. Hence the motions can be controlled by the operators on the ground. Mechanically, all the rotary motions interface can be supported by bearings or plain bearings if needed.

Additionally, there is an important feature designed for the purpose of recombination of the junction box 100 towards the junction plate 200. Referring to FIGS. 5*a* and 5*b*, when the junction box 100 is separated, it is designed that the lower connector section 310 will stem out of the upper surface of the junction box 100 for some millimetres. At the same time, the locked upper connector section 320 in the through-hole 201 left a cavity of some millimetres recessed from the lower surface of the junction plate 200. When the junction box 100 goes to recombine with the junction plate 200, the stemmed out part of the lower actuation connector section 320 should go to insert into the cavity left at the bottom of the junction plate 200. Besides, the cross-section of the upper connector section 320 and matching through-hole 201 are elliptical. These designs help to fix the angular relation between the junction box 100 and the junction plate 200 in the horizontal plane during recombination. With this angular relation fixed, the electric female connector 120 and male connector 220 can always align and plug correctly during recombination.

Figure 6:
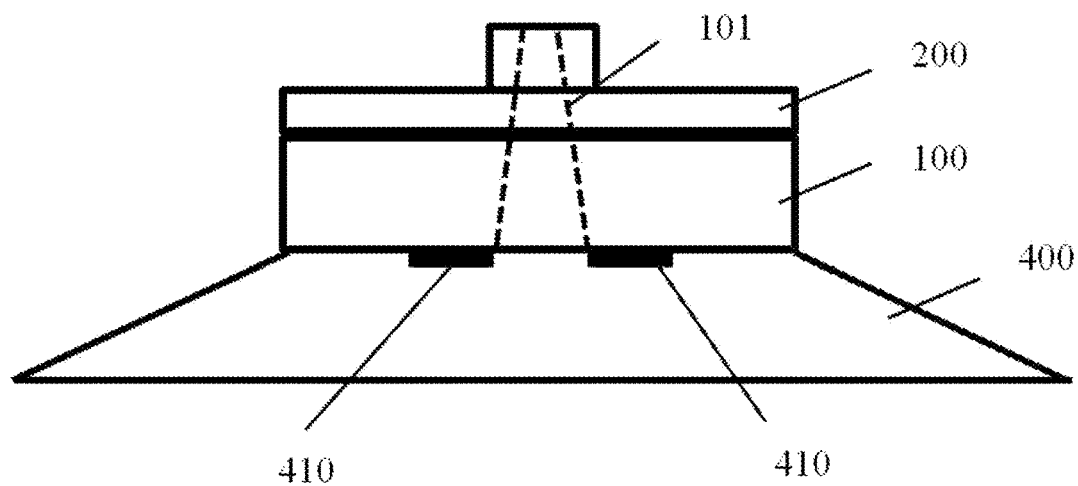
FIG. 6 is a schematic view showing the lighting housing bonded to the junction structure and the light sources arrangement.

Finally, for the lighting housing 400 to be installed with this junction structure comprising the first and second junction parts 100 and 200, it should have a central through-hole 401 aligning with through-holes 101 and 201 of the first and second junction parts 100 and 200. Therefore, the light source 410 of the lighting should not be located at the central region but rather shifted to the side of the central hole as shown in FIG. 6. For lighting installed high in the ceiling, this centimetre shift of light source does not give noticeable illumination performance effect on the ground.

Figure 7:
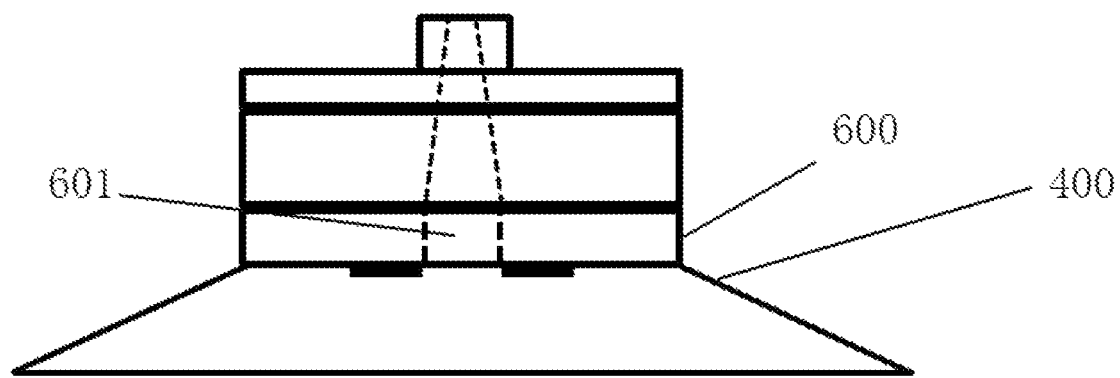
FIG. 7 is a schematic view showing the lighting housing bonded to the junction structure and the light sources arrangement according to another embodiment of the present invention.

For the lighting shown in FIG. 6, the electronic driver can be located inside the junction box 100. For other common types of high bay light, FIG. 7 shows another version of the housing structure. As shown in FIG. 7, the junction structure further comprises a heat sink 600 arranged between the second junction part 100 and the lighting housing 400. Then there will be also a through-hole 601 inside the heat sink 600 accordingly.

Lowering and Raising Procedures

The lowering procedure is described as follow. Raising the actuation connector 300 to the through-hole 101 by the unmanned aerial vehicle or an equivalent device. Inserting the actuation connector 300 into the through-holes 101 and 201. There is chamfer at the edge of the through-hole 101 to help the insertion. Using the remote control to lock the actuation connector 300 to the junction plate 200 by rotating the locking actuator 321 in the actuation connector 300 through ninety degrees. Then the upper connector section 320 is locked to the junction plate 200. Using the remote control to switch on the latching actuator 311 in the lower connector section 310 to rotate the rotary ring 112 in the junction box 100. The latch shaft 111 in the junction box 100 is then rotated out of the latch ring 211 of the junction plate 200. So the junction structure is separated. The operator on the ground then releases the held wire 330 gradually. The wire 330 wired around the pulley 323 hence releases the junction box 100 and the lighting housing 400 to ground. The junction plate 200 does not move but still keeps connected with the junction box 100 through the long wire 330.

The raising procedure is described as follow. After maintenance, the operator uses the wire 330 to raise the junction box 100 and the lighting housing 400. The wire 330 is wired around the pulley 323 which is fixed to the junction plate 200. Hence pulling the wire 330 can lift the junction box 100 and the lighting housing 400 upward. There is a portion of the upper connector section 320 protruding out from the top of the junction box 100. When the junction box 100 recombines with the junction plate 200, this protruded part is firstly inserted into the small cavity at the bottom of the through-hole 201 of the junction plate 200. At the same time, the male connector 220 and female connector 120 of the electric plug are reconnected. Then the junction box 100 and the junction plate 200 are latched together again by rotating the latch shafts 111 into the latch rings 211. This rotation is actuated by the latching actuator 311 controlled by the remote control on the ground. After latched, the locking actuator 321 is rotated backwards by ninety degrees. Then the actuation connector 300 together with the wire 330 are released and dropped down to the ground.

Although the invention is described with reference to one or more preferred embodiments, it should be appreciated by those skilled in the art that various modifications are possible. Therefore, the scope of the invention is to be determined by reference to the claims that follow.

We claim:

1. A system for lowering and raising lighting or signage, comprising
    a junction structure installed onto the lighting or signage hanging high above the ground and configured to provide main mechanical and electrical connection for the lighting or signage; wherein the junction structure is separable into at least a first junction part and a second junction part; the first junction part is bonded to the lighting or signage and the second junction part is permanently suspending and staying above the ground; during the normal service life of the lighting or signage, the two junction parts are latched together; and when lighting or signage maintenance is needed, the two junction parts are capable of being unlatched and separated;
    an actuation connector bonded with a long wire and capable of being raised to and engaged with the junction structure to lower the lighting or signage; wherein after engagement, the junction structure is separated into the two junction parts by actuation of the actuation connector; subsequently the lighting or signage can be lowered to the ground using the long wire; and after maintenance, using the long wire, the lighting or signage can be raised back to original height and resuming normal service; and
    an unmanned aerial vehicle used to raise the actuation connector to the junction structure and ensure the actuation connector be engaged with the junction structure.

2. The system of claim 1, wherein the unmanned aerial vehicle is capable of raising the actuation connector towards a hole in the junction structure and then inserting the actuation connector into the hole; at the same time one end of the long wire in the actuation connector is also raised to the junction structure; and then the other end of the long wire hangs down to the ground after the actuation connector engaged with the junction structure, or it just stays on the ground during the operation.

3. The system of claim 1, wherein the junction structure comprises:
    the first junction part which is a lower part of the junction structure bonded to the lighting or signage;
    the second junction part which is an upper part of the junction structure permanently suspending from the ceiling or supporting structure and staying high above the ground;
    a latch located in-between the first and second junction parts so as to latch them together;
    an electric plug located at an interface between the first and second junction parts and composed of a male connector and a female one positioned separately on the interface between the first and second junction parts; and
    a cavity configured to accommodate the actuation connector and enable the actuation connector to engage with the junction structure so as to actuate the latch, wherein the cavity is a through-hole along a central vertical axis of the junction structure and the cavity surface is of conical shape.

4. The system of claim 3, wherein the latch comprises a circular latch shaft, a latch ring and a rotary ring; the circular latch shaft is rotatable as so to insert into the latch ring; the latch shaft and the latch ring are installed separately onto matching surfaces of the first and second junction parts; the latch shaft is fixed onto the rotary ring installed in a plane of the first junction part; the rotary ring has a spline or gear structure to match with another spline or gear in the actuation connector so that rotational actuation from the actuation connector can be transmitted to the rotary ring after the actuation connector engages with and locks to the junction structure; and the latch ring installed in the second junction part is capable of stemming out for reach and match of the insertion of the latch shaft.

5. The system of claim 1, wherein the actuation connector is configured to latch and unlatch the latch in the junction structure and to raise the long wire to the junction structure for lowering the lighting or signage; the actuation connector has a rod-like shape with an approximately conical surface which is matching with the shape of an inner surface of the through-hole in the junction structure so that the engagement of the actuation connector with the junction structure is therefore simply an insertion action of the conical actuation connector into the conical through-hole in the junction structure; cross-sections of the actuation connector and the through-hole are deviated from circular shape so that when the actuation connector is inserted into the through-hole, angular relation between the first and second junction parts is fixed during recombination; and the actuation connector comprises:
    a separable body structure which is separable into an upper and a lower connector section during the lowering of the lighting or signage; wherein the two sections are bound by adhesive before the separation; and the adhesive bond can be broken during separation;
    a locking actuator used to lock the actuation connector to the junction structure by an actuation of the locking actuator after the engagement of the actuation connector with the junction structure;
    a latching actuator used to operate the latch in the junction structure; wherein actuation of the latching actuator is capable of latching and unlatching the latch in the junction structure through a spline or gear structure after engagement of the actuation connector with the junction structure; and
    a wire connection mechanism used to raise the long wire to engage with the junction structure; wherein the long wire is fixed and wired inside the actuation connector; after engagement of the actuation connector with the junction structure, the junction structure is unlatched; after unlatched, the first junction part is separated and lowered by holding and releasing the long wire held by an operator or a machine on the ground; and the lighting or signage is lowered to the ground together with the first junction part.

6. The system of claim 5, wherein the locking actuator has a locking component; movement of the locking component is capable of locking the actuation connector to the junction structure during the engagement of the actuation connector with the junction structure; the locking component is a small rotor located at the tip of the upper connector section; movement of the rotor is capable of locking the actuation connector to the second junction part due to geometric constraint; the rotor is an ellipsoid or cuboid with its cross-section having a certain aspect ratio other than one; the ellipsoidal or cuboidal rotor is stemming out of a top surface of the second junction part after the engagement of the actuation connector with the junction structure; the rotor is capable of rotating about an axis of the actuation connector; with such elliptic cross-sectional geometry, after a ninety-degree rotation, the rotor cannot recess backward; therefore the actuation connector is locked to the second junction part.

7. The system of claim 5, wherein the latching actuator is configured to actuate the latch in the junction structure after the actuation connector locked to the junction structure; the actuation is transmitted through a spline or gear structure to latch and unlatch the latch; the latching actuator is a rotary latching actuator structured as part of the body structure of the actuation connector and has spline on rotor circumferential surface; when the actuation connector is locked to the junction structure, a rotor of the latching actuator contacts with the rotary ring in the junction structure by matching the spline structures on both sides; then the rotation of the latching actuator can be transmitted to the rotary ring and the latch shaft.

8. The system of claim 5, wherein the wire connection mechanism comprises:
   a fixation point in the lower connector section for fixing one end of the long wire;
   a pulley in the upper connector section;
   a channel for the long wire in the lower and upper connector sections, which runs along a central axis; and
   the long wire wired from the fixation point in the lower connector section through the channel to the pulley in the upper connector section, then turned around the pulley and then gone back through the channel to exit the lower connector section, and finally hung down to the ground;
   wherein the wire connection mechanism is embedded in the body structure of the actuation connector.

9. The system of claim 5, wherein ultrasonic motors are used as the locking and latching actuators.

* * * * *